D. E. SOMES.
Refrigerating Apparatus.
No. 99,254.
2 Sheets—Sheet 1.
Patented Jan. 25, 1870.
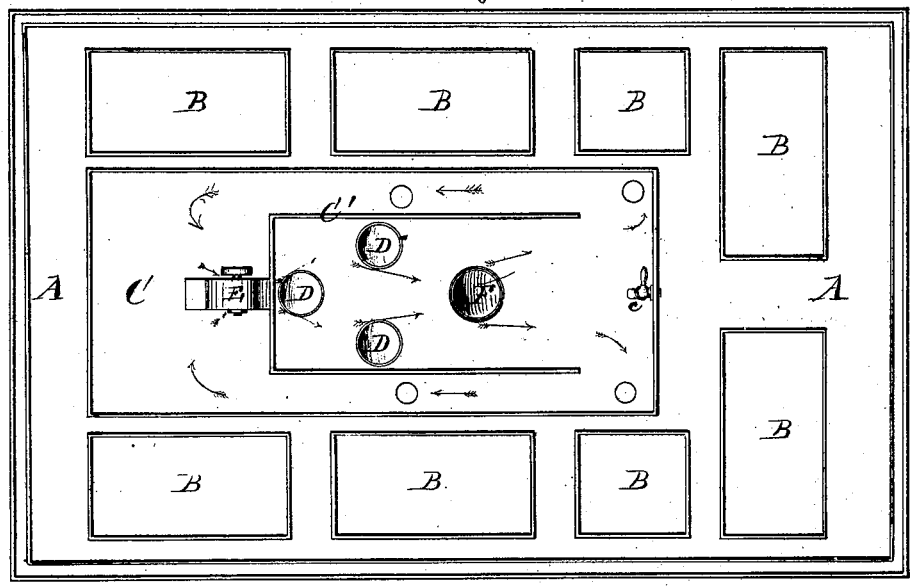
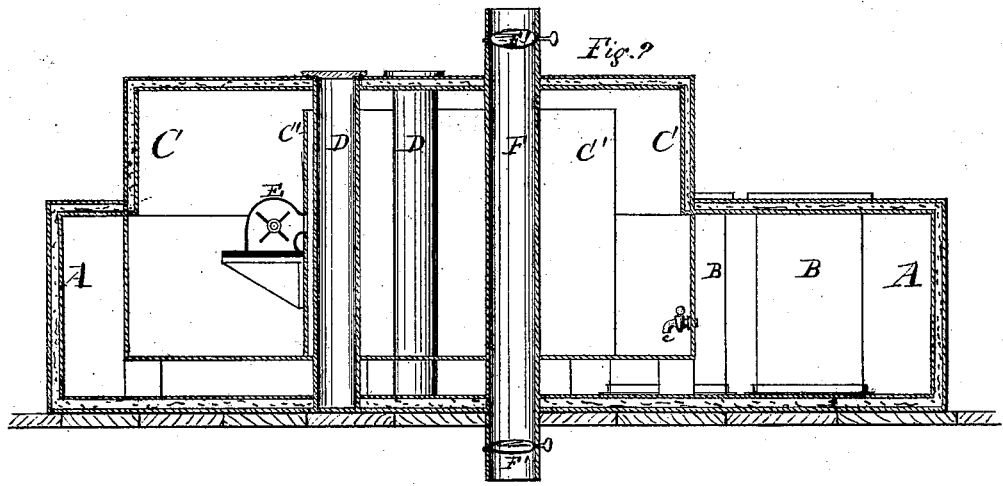

D. E. SOMES.
Refrigerating Apparatus.
No. 99,254.
2 Sheets—Sheet 2.
Patented Jan. 25, 1870.
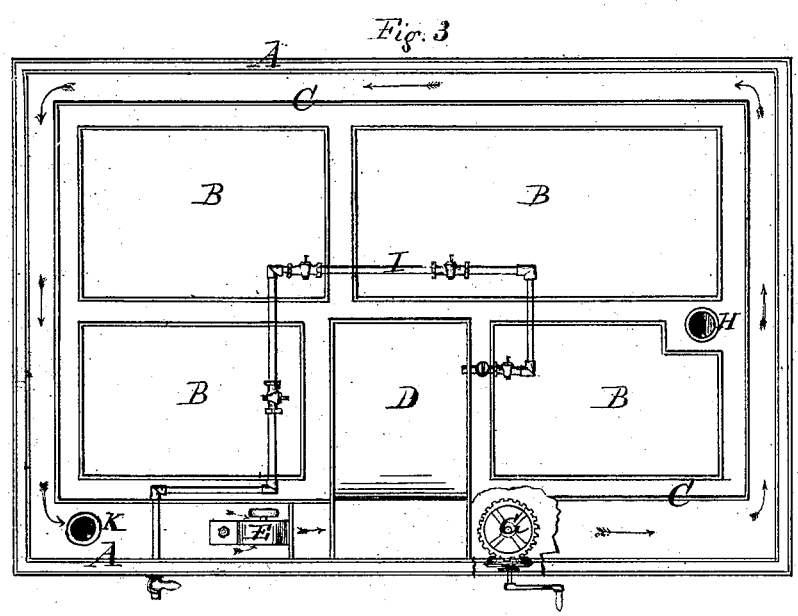
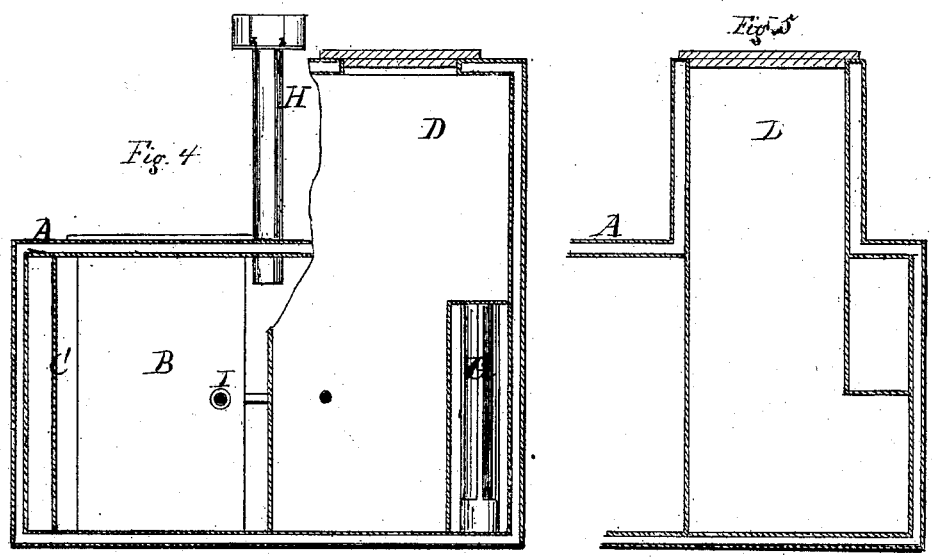

United States Patent Office.

DANIEL E. SOMES, OF WASHINGTON, DISTRICT OF COLUMBIA.

Letters Patent No. 99,254, dated January 25, 1870.

---

IMPROVEMENT IN APPARATUS FOR PRESERVING AND FREEZING.

---

The Schedule referred to in these Letters Patent and making part of the same.

---

To all whom it may concern:

Be it known that I, DANIEL E. SOMES, of Washington, in the county of Washington, and in the District of Columbia, have invented a new and useful Improved Apparatus for Preserving and Freezing; and I do hereby declare that the following is a full, clear, and exact description thereof, reference being had to the annexed drawings, making part of this specification, in which—

Figure 1 is a plan view of my improved apparatus for preserving and freezing, the upper portion of the freezing or cooling-chamber and the top of the preserving-chamber being broken away, to show their interior arrangements.

Figure 2 is a vertical sectional elevation of the machine or apparatus shown in fig. 1.

Figure 3 is a plan view of an apparatus somewhat different in construction from the one shown in figs. 1 and 2, but involving the same principles.

Figure 4 is a sectional elevation of the apparatus shown in fig. 3.

Figure 5 is a sectional elevation of a portion thereof, showing a somewhat different construction of the ice-receptacle from that shown in fig. 4.

The same letters are used in all the figures in the designation of identical parts.

My invention relates to an apparatus for preserving and freezing, it being intended for use in large meat-packing and preserving establishments, large hotels, hospitals, &c. It may, however, be constructed on a smaller scale, and used in other places.

My improvements consist in several peculiarities of construction and arrangement of the various parts, as will be more fully set forth in the following specification and claims.

To enable those skilled in the art to make and use my invention, I will proceed to describe its construction and operation.

In the annexed drawings—

A represents a large reservoir, of convenient form, built of any suitable material, and so that it will hold water. Its walls should be double or multiple, and non-conducting material packed between them in the manner usual in refrigerators and like devices. Suitable doors may be made in one or more points, to permit persons to enter into the same.

A number of tanks, B B, is placed in this reservoir, to receive the meat to be salted and cured, or other substances to undergo a process in which it is necessary that they should be kept at a low temperature. These tanks may be made of various convenient sizes, constructed of sheet-metal, glass, and the like.

C represents the cooling-chamber, either built in the surrounding reservoir permanently, which is preferable in this case, or it can be constructed separately from such reservoir, so that it can be placed at any point in the same. The upper end of this chamber, when above the top of the reservoir, as I have shown it, is also constructed with double walls like the reservoir.

A partition, C', is built within the cooling-chamber, reaching from the bottom of the same to near its top, or quite up to the top, so as to form an interior chamber closed upon three sides, but open upon the fourth.

Within this interior chamber are placed one or more receptacles, D, reaching from the top of the cooling-chamber down through its bottom, to the bottom or floor of the reservoir, one of them, when several are used, being placed close to the end wall of the inner chamber, as shown in figs. 1 and 2. Their open tops are closed by doors or heads D'.

E represents a fan-blower, arranged on the end wall of the interior chamber, directly opposite one of the ice-receptacles D, its exhaust-pipe extending through such wall, so that on putting the blower in motion, a blast of air is blown directly against the cold wall of such ice-receptacle.

F is a pipe or tube, extending entirely through both the cooling-chamber and reservoir, and which is used, when this apparatus is placed in upper stories of buildings, to cool the lower portions or apartments.

Dampers F' are employed to shut off the circulation of air through this pipe.

This apparatus may be used in the following manner:

The ice-receptacles are filled or partly filled with ice, ice and salt, or other cooling-substances, and the tanks may be partly submerged in brine or other liquid. If a very low temperature is desirable, the blower is put in motion, which creates a constant current of air through the cooling-chamber, it being drawn from the outer chamber and blown into the interior one, where it comes in contact with the cold surfaces of the ice-receptacles, and is thus cooled every time it passes them. Sometimes it may be desirable to have the bottom of the cooling-chamber covered by a few inches of brine or other liquid used in the surrounding reservoir, out of which it may then be drawn through a faucet, c.

Suitable cocks or gates must, of course, be arranged in the bottom of the ice-receptacles to permit the accumulating water to be drawn off from them, as also in different parts of the reservoir and cooling-chamber.

In figs. 3, 4, and 5, one chamber, C, or reservoir is built within the other, A, with a narrow passage between them, through which the air is made to circulate. In this case the tanks B are placed in the inner chamber C. The ice-receptacle D is located upon one side, so that its outer wall may form part of the wall of the inner chamber. The blower E is arranged in front of a partition in the passage, close to the ice-receptacle, as shown in fig. 3; and upon the opposite side of said receptacle, and in the passage, I have shown an ice-cream freezer, G, which is here in a very favorable position, as the air strikes it directly after bouncing off the sides of the ice-receptacle.

H is an evaporating tube or pipe. The construction and operation of such a pipe have been fully described in application for a patent for a refrigerating and preserving-box, herewith filed, and to which reference is here made for a more full description than it is necessary to give here of such pipe.

I represents a pipe, issuing from the ice-receptacle, and led through all the different tanks, and provided with cocks in each tank for the purpose of letting cold air from said receptacle into some or all of the tanks, at times when it may be desirable to do so.

K, in fig. 3, represents an additional ice-receptacle, placed in the air-passage between the two chambers, and somewhat in advance of the blower, for the purpose of still further cooling the air circulating in said passage. These receptacles may be multiplied.

Shallow tanks may be placed in various parts of the air-passage, and filled with ice, ice and salt, or other cooling-substances, so that the air in passing over them may be further cooled.

This apparatus is applicable to ships and other vessels, and cars and other vehicles, as well as to buildings, apartments, and family refrigerators.

What I claim as my invention, and desire to secure by Letters Patent, is—

1. The reservoir A, cooling-chamber C, interior chamber C', ice-receptacle or receptacles D, and blower E, substantially as and for the purpose set forth.

2. In combination with the elements of the preceding clause, the pipe F, substantially as and for the purpose set forth.

The above specification signed by me, this     day of         , 18

D. E. SOMES.

Witnesses:
   B. EDW. J. EILS,
   F. C. SOMES.